United States Patent
Barth et al.

(10) Patent No.: US 6,560,888 B1
(45) Date of Patent: May 13, 2003

(54) INTERNAL SHIM

(75) Inventors: Clyde H. Barth, Ballston Lake, NY (US); Theodore W. Blizinski, Latham, NY (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 10/040,746

(22) Filed: Jan. 9, 2002

(51) Int. Cl.[7] .............................. G01B 5/14; G01B 5/12
(52) U.S. Cl. ....................... 33/542; 33/544.2; 33/544.5
(58) Field of Search ......................... 33/542, 613, 544, 33/544.2, 544.3, 544.5, 552

(56) References Cited

U.S. PATENT DOCUMENTS 2,456,497 A * 12/1948 Forsmark ..................... 33/542
4,438,566 A * 3/1984 Sakata et al. ............... 33/544.5
4,872,269 A * 10/1989 Sattmann ..................... 33/552

* cited by examiner

Primary Examiner—Christopher W. Fulton
(74) Attorney, Agent, or Firm—Julia Cook Moody; Paul A. Gottlieb

(57) ABSTRACT

An internal shim used to accurately measure spaces in conjunction with a standard small probe has a shim top and a chassis. The internal shim is adjustably fixed within the space to be measured using grippers that emerge from the chassis and which are controlled by an arm pivotably attached to the shim top. A standard small probe passes through the shim along guides on the chassis and measures the distance between the exterior of the chassis and the boundary. By summing the measurements on each side of the chassis and the width of the chassis, the dimension of the space can be determined to within 0.001 inches.

3 Claims, 4 Drawing Sheets

INTERNAL SHIM

CONTRACTUAL ORIGIN OF THE INVENTION

The United States Government has rights in this invention as provided under the terms of a contract with the United States Department of Energy.

BACKGROUND OF THE INVENTION

1. Field of the Invention

This invention is related to the dimensional inspection of internal spaces. More particularly, it relates to an apparatus that assists with the measurement of spaces using standard small probes to provide a measurement of the space to a high degree of accuracy. The apparatus is capable of being positioned and locked into the space to be measured and later removed. This invention is also a method of measuring a space using the apparatus.

2. Description of Prior Art

Large internal space dimensional inspection has previously involved the use of unique probes designed for such large spaces. These large space probes were similar to more standard small probes but they lacked the ability to maintain good surface contact with the boundaries of the space to be measured which resulted in errors in measurements and an inability to reproduce consistent measurements of the same space.

SUMMARY OF THE INVENTION

An internal shim has at least one dimension that is less than the dimension of a space defined by boundaries that is to be accurately measured. The internal shim has a chassis that defines a plurality of push rod passages and a plurality of pairs of gripper openings. Each gripper opening of a pair of gripper openings are on opposite sides of the chassis and are separated by the push rod passage. The internal shim has a shim top end that is wider than the boundaries of the space to be measured. The shim top end has a top and a bottom and defines a plurality of push rod openings therethrough. The shim top end is attached to one end of the chassis such that the push rod passages and the push rod openings are aligned. A push rod is disposed within each of the push rod passages and passes through a push rod opening. Each push rod has a length which is approximately equal to the length of the push rod passage. The push rod has a cross sectional dimension that is uniform along its length. However, it also has a plurality of sections, which correspond to the pairs of gripper openings, wherein the cross sectional dimension is larger than the normal uniform dimension and tapers from that dimension along a portion of its length to a smaller uniform dimension. A gripper element is disposed within each gripper opening. The gripper element comprises a gripper and a rod attached thereto. The top end of the gripper rod is rotatably attached to the chassis. Placement of the gripper elements is such that the gripper portion of the gripper element is immediately adjacent to those sections of the push rod having a tapered rather than uniform cross sectional dimension. The gripper openings are of sufficient size such that the grippers can extend from the chassis body.

An arm, one end of which is pivotably attached to the top of the shim top end, passes over each push rod opening. The arm is adapted to co-act with the top end of the push rod. The other end of the arm is adjustably attached to the top of the shim top end. A spring mechanism is disposed between those sections of the push rod having a tapered cross sectional area and the chassis within the push rod passage. The spring mechanisms are disposed between each of those tapering sections except for the section closest to the bottom end of the push rod.

During use, the grippers are forced from the chassis against the boundaries of the space to be accurately measured. The grippers hold the internal shim firmly in the space to be measured. The grippers are forced from the chassis by the action of the sections of the push rod having a tapered cross sectional area acting against the grippers when the arm is adjusted, such that the push rod moves downward relative to the push rod passage. When the measurement of the space is complete, the arm is adjusted such that the sections of the push rod having a smaller uniform cross sectional dimension are between the grippers, allowing the grippers to return within the chassis and permitting the internal shim to be removed from the space.

In a second preferred embodiment, the chassis also defines a plurality of pairs of guide channels through which a standard small probe can pass. In one pair of guide channels, each guide channel is on opposite sides of the chassis. Each guide channel is continuous along the entire length of the chassis. This guide channel is aligned with a guide opening in the shim top end that is also large enough for a standard measurement probe to pass. In this way, measurements of the space to be measured can be periodically repeated along a location that is fixed relative to the dimensions of the internal shim.

A method of accurately measuring a space defined by boundaries using the internal shim and a standard small probe comprises the following steps:

1) measuring and recording the thickness dimension of the shim between the opposing guide channels at the location where measurements will occur;
2) placing the internal shim within the space to be measured;
3) adjusting the arms such that the internal shim is firmly fixed in the space to be measured;
4) inserting a standard small probe in the first guide channel of the internal shim and one boundary of the space to be measured;
5) measuring and recording a plurality of distances from the bottom of the guide channel of the internal shim to the boundaries of the space to be measured using the standard small probe;
6) repeating steps 4 and 5 to measure spaces on the oposite side of the chassis.
7) adjusting the arms such that the internal shim is no longer fixed in the space to be measured;
8) removing the internal shim from the space; and
9) summing the recorded measurements to determine the dimensions between the boundaries of the spaces to be measured.

Further details and advantages of the invention may be seen from the following detailed description in conjunction with the accompanying drawings, wherein like reference numerals represent like parts.

DETAILED DESCRIPTION OF THE PREFERRED EMBODIMENTS

Figure 1:
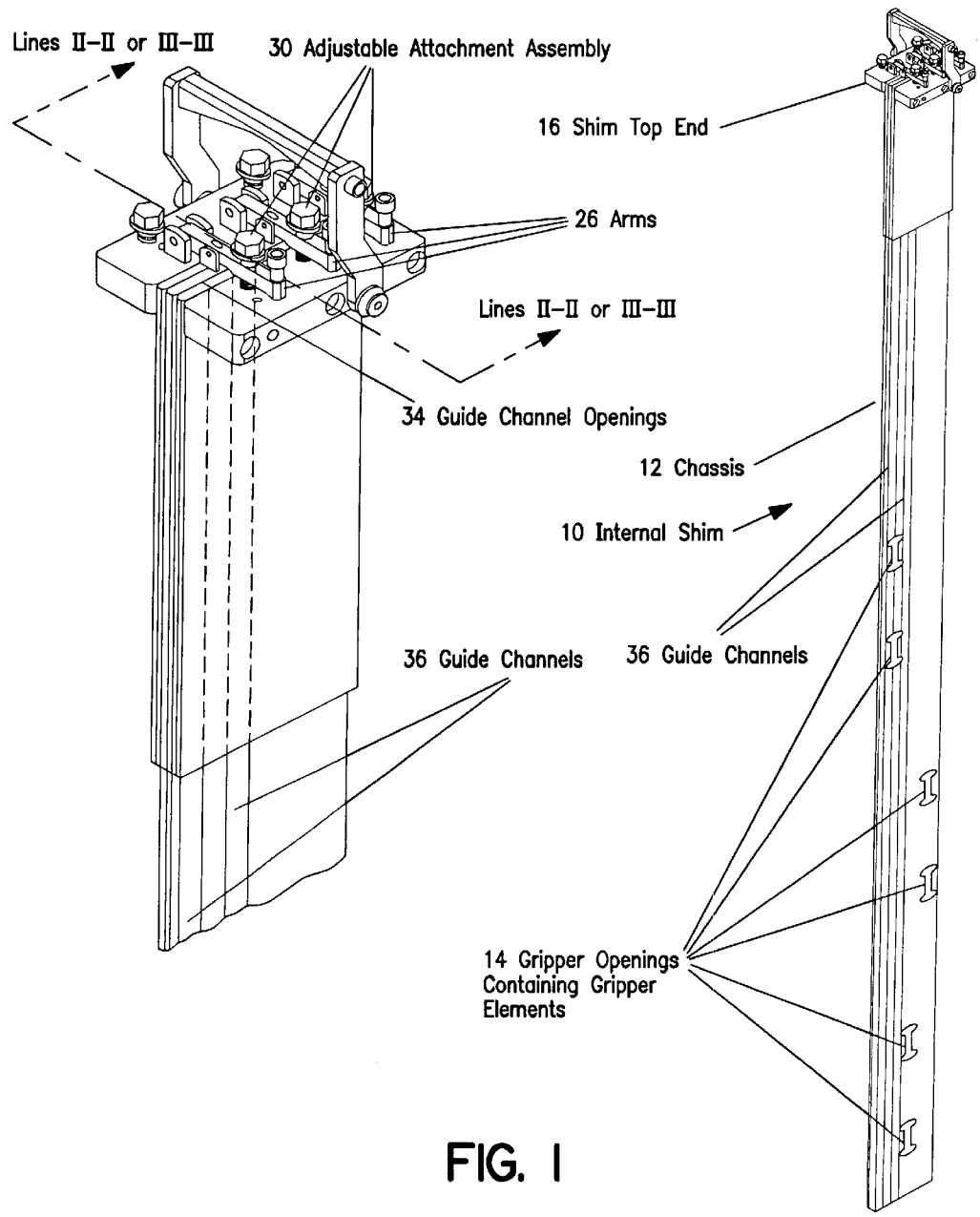
FIG. 1 is a perspective view of the internal shim.
Figure 2:
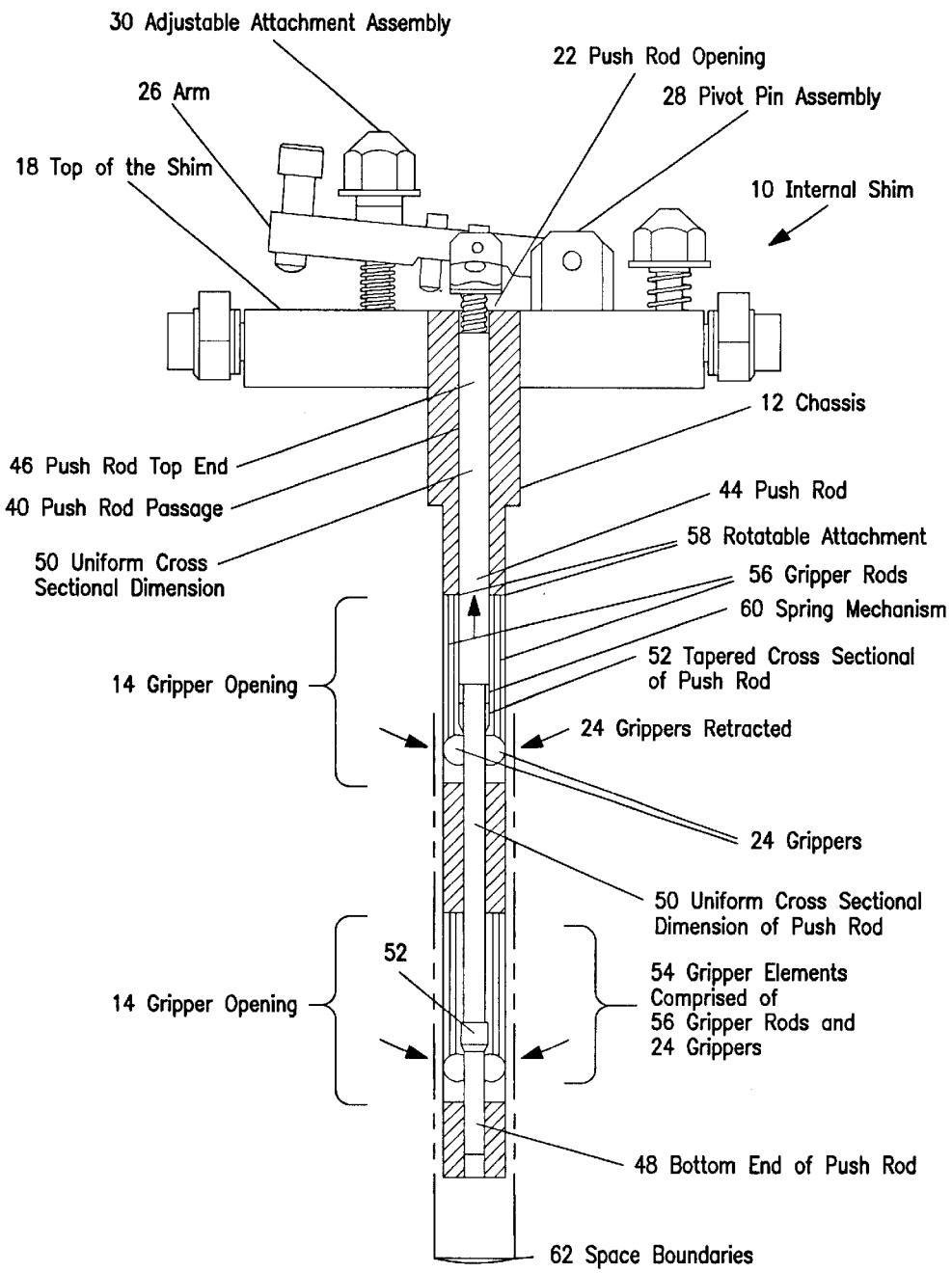
FIG. 2 is a side view of the internal shim in partial cross section along line II—II of FIG. 1 with grippers retracted within the chassis.

Referring to FIG. 1 and FIG. 2, the internal shim 10 of the present invention is shown. The internal shim 10 consists of two main sections, a chassis 12 and a shim top end 16. The shim top end 16 is attached to the top end of the chassis 12. The internal shim 10 is constructed such that the internal shim 10 maintains rigidity during use and the relative dimensions of each of its components are fixed. In a particularly preferred embodiment, the internal shim 10 is constructed from stainless steel type 17-4-ph. The chassis 12 defines a plurality of pairs of gripper openings 14 on each side of the chassis. A gripper element 54 is seated in each gripper opening 14. Attached to the top of the shim 18 (i.e., the top of shim top end 16) are a plurality of arms 26. One end of each arm 26 is attached using a pivot pin assembly 28. Each arm passes over a push rod opening 22. The other end of each arm 26 is attached to the top of the shim 18 using an adjustable attachment assembly 30. In this way, the dimension between the top of the shim 18 and the bottom of the arm 26 can be varied by adjusting the adjustable attachment assembly 30. The shim top end 16 defines a plurality of guide openings 34 that are in alignment with a plurality of guide channels 36 on either side of chassis 12. The dimensions of the guide openings 34 and the guide channels 36 are of sufficient size such that a standard small measurement probe can pass therethrough to measure the dimension of the space between a space boundary 62 and the exterior of the chassis 12.

FIG. 2 shows a side view of internal shim 10, and more particularly, the chassis 12 is shown in partial cross section along line II—II of FIG. 1. The chassis 12 defines a plurality of pairs of gripper openings 14. A gripper element 54 is seated in each gripper opening 14. Each gripper element 54 comprises two members, a gripper rod 56 and a gripper 24. The top end of the gripper rod 56 is attached to the chassis 12 using a rotatable gripper attachment 58. In FIG. 2., the plurality of grippers 24 are retracted within the chassis 12.

FIG. 2 also shows one of the push rod passages 40 defined by the chassis 12. A push rod passage 40 traverses from the top of the chassis 12 that is attached to the shim top end 16 to the distal end of the chassis 12. A push rod 44 is disposed within the push rod passage 40 and also passes through the push rod opening 22 defined by the shim top end 16. The push rod 44 comprises a plurality of sections having uniform cross sectional dimension 50. In addition, the push rod 44 also comprises a plurality of sections having tapered cross sectional dimension 52. Each of the sections of the push rod having a tapered cross sectional dimension 52 is oriented such that the top of the section, when viewed in FIG. 2, is larger than the section of the push rod having a uniform cross sectional dimension 50 and tapers from that larger dimension to the uniform cross sectional dimension at the bottom of the section. Each of the sections of the push rod having tapered cross sectional dimension 52 corresponds to locations of the chassis 12 having a pair of gripper elements 54. A tapered cross sectional dimension 52 of the push rod 44 is proximal to the pair of grippers 24 of the pair of gripper elements 54. Each section of the push rod having tapered cross sectional dimension 52 (except for sections closest to a bottom end of push rod 48), has a spring mechanism 60 disposed at the large top of the section.

The tapered cross sectional dimension 52 closest to a bottom end of the push rod 48 is rigidly fixed to the push rod 44. The upper tapered section 52 is not fixed to the push rod 44 and slides relative to the motion of the push rod. This sliding motion is resisted by spring mechanism 60. The function of the spring mechanism 60 and the sliding motion of the upper tapered section 52 ensure contact between the upper and lower grippers 24 to the space boundary 62. This feature is essential to render the internal shim fixed and non-moving in the space to be measured.

The arm 26 is attached to the top of the shim 18. As discussed above, one end of the arm 26 is attached to the top of the shim 18 using pivot pin assembly 28. The other end of the arm 26 is attached to the top of the shim 18 using adjustable attachment assembly 30. In this embodiment, adjustable attachment assembly 30 is an actuator screw backed out 6 to 8 turns from hand tight. The arm 26 passes over the push rod opening 22 and co-acts with the push rod top end 46. With the arm 26 in the position shown in FIG. 2, sections of push rod having a tapered cross sectional dimension 52 are immediately adjacent to, yet above, the grippers 24 of the gripper elements 54 such that the grippers 24 remain within the chassis 12. In this condition, the internal shim can be inserted into the space between the space boundaries 62 because the width of chassis 12 is less than the dimension between the space boundaries 62.

Figure 3:
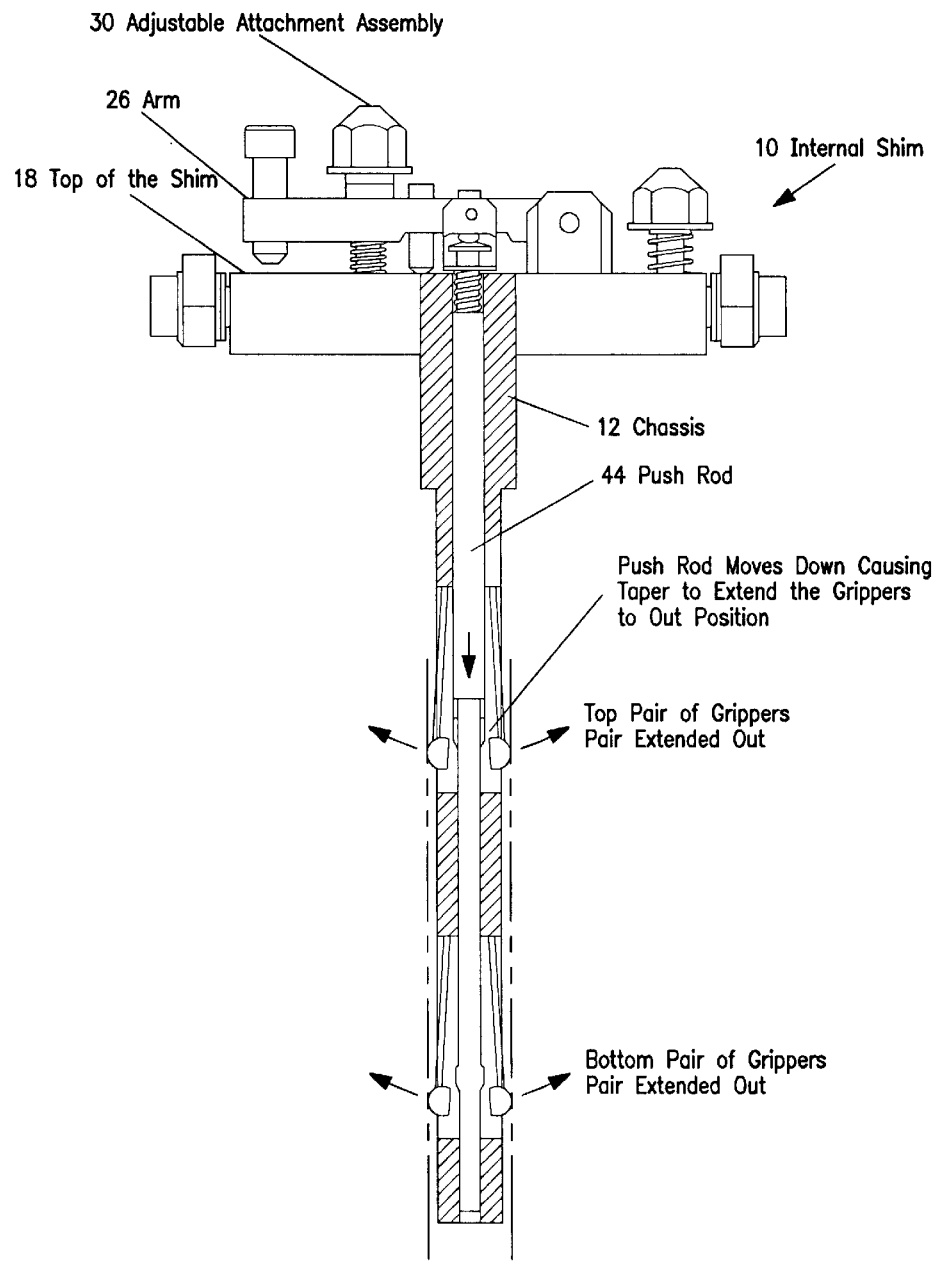
FIG. 3 is a side view of the internal shim in partial cross section along line III—III of FIG. 1 with grippers protruding from the chassis.

FIG. 3 shows internal shim 10 with the grippers 24 protruding from the chassis 12. Adjustable attachment assembly 30 has been rotated six to eight turns reducing the dimension between the bottom of the arm 26 and the top of the shim 18. The arm 26 co-acting with the push rod 44 forces the push rod 44 down the push rod passage 40 relative to chassis 12. The movement of the push rod 44 relative to the chassis 12 causes the sections of push rod having a tapered cross sectional dimension 52 to push against the grippers 24. Because the top of sections of push rod having a tapered cross sectional dimension 52 are larger than the sections of the push rod having a uniform cross sectional dimension 50, as viewed in FIG. 3, the grippers 24 are extended out from the chassis 12. The grippers 24 then engage the space boundaries 62 of the space to be measured fixing internal shim 10 in place in that space. At this point, a standard small probe, not shown, can be inserted through the guide openings 34, as shown in FIG. 1, and the guide channels 36 to measure the dimension between the exterior of the chassis 12 and the space boundaries 62. This process is repeated in the guide openings and channels on both sides of the chassis. The location of the measurement of that distance is known, as is the precise dimension of the width of chassis 12 at that location, as shown in FIG. 3. In this way, the dimension of the space between the space boundaries 62 can be accurately determined. By fixing the internal shim in place within the space defined by the space boundaries 62, measurements of the space between the space boundaries 62 can be determined to within 0.001 inches. The accuracy of the measurement of the space is improved because standard small probes, (not shown), are far less likely to move during the measurement as compared to using a small space probe, not shown, adapted to measure such larger spaces.

The spring mechanisms 60 disposed between the sections of push rod having a tapered cross sectional dimension 52 and the chassis 12 ensure that the internal shim 10 is firmly fixed within the space defined by the space boundaries 62. Without the spring mechanisms 60, a first pair of grippers 24 might contact a space bound by the space boundaries 62 before a second set of grippers 24 are in firm contact with the space defined by the space boundaries 62. In this way, every gripper 24 comes into firm contact with the space boundary 62 to which it is adjacent. Even if the space proximal to any pair of grippers 24 defined by the space boundaries 62 is more narrow than a similar dimension, every pair of grippers 24 must be in firm contact with the space boundary 62 to which it is adjacent before adjustable attachment assembly 30 can no longer rotate. Accordingly, the travel of the push rod 44 relative to the chassis 12 is controlled to ensure the stability of the internal shim 10 relative to the space defined by the space boundaries 62 along the entire length of the chassis 12. The action of the grippers 24 against the space defined by space boundaries 62 is such that the internal shim 10 is rigid and non-moving during measurement using standard small probes, (not shown).

Following the measurement of the space between the exterior of the chassis 12 and the space boundary 62, adjustable attachment assembly 30 is rotated such that the arm 26 returns to its position as shown in FIG. 2. This allows the push rod 44 to travel upwards within the push rod passage 40 to its location as shown in FIG. 2 as compared to that location as shown in FIG. 3. The spring mechanisms 60 ensure that the push rod 44 travels relative to the chassis 12 when adjustable attachment assembly 30 is rotated returning arm 26 to its position in FIG. 2. The location of sections of the push rod having a tapered cross sectional dimension 52 relative to the location of the grippers 24 is that as shown in FIG. 2. Accordingly, the grippers 24 retract and return to the body of the chassis 12. Because the width of the chassis 12 is now less than the dimension of the space defined by the space boundaries 62, the internal shim 10 can now be removed from that space and it can be used to measure another space similar to the space defined by space boundaries 62.

Figure 4:
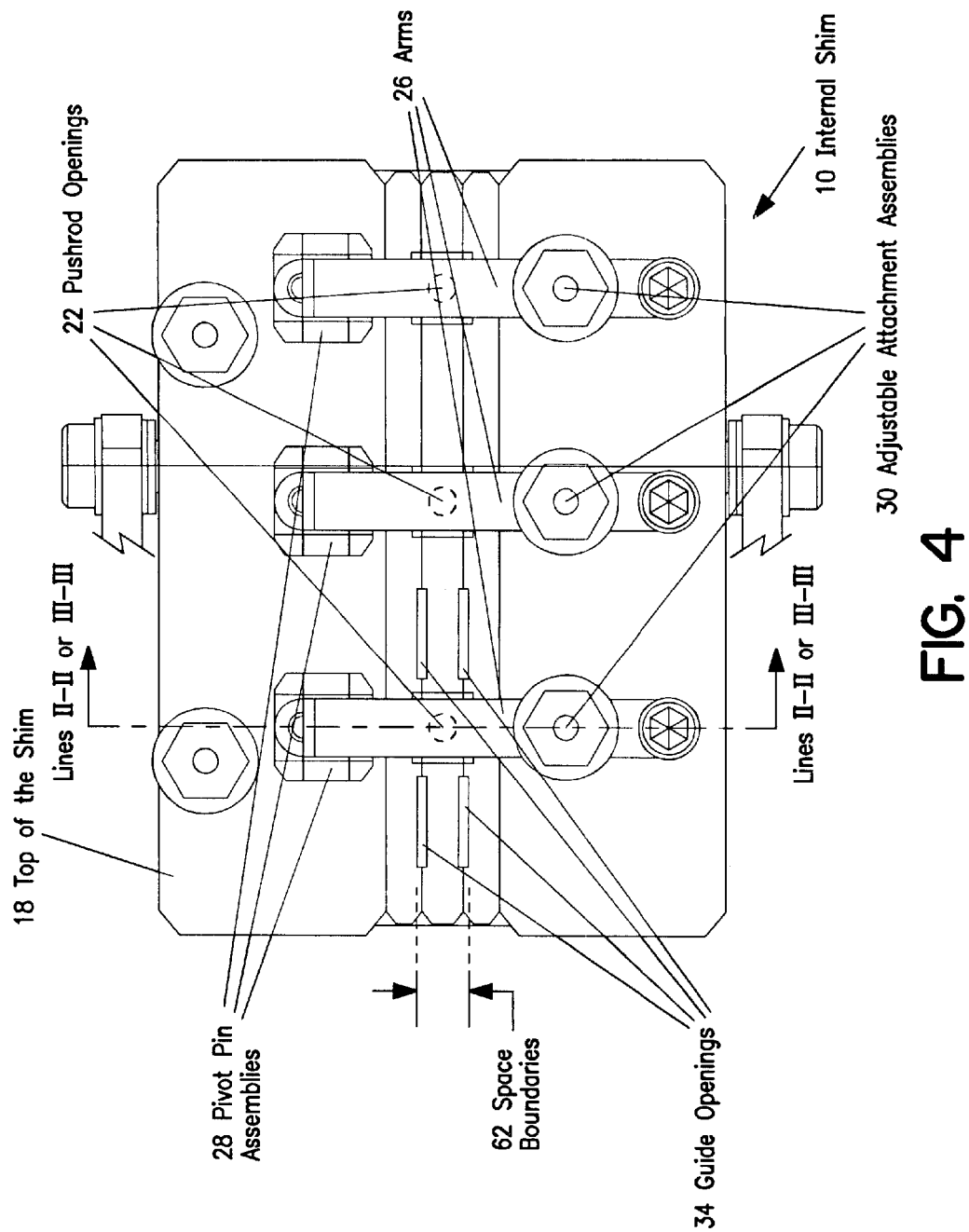
FIG. 4 is a top view of the internal shim of FIG. 1.

FIG. 4 shows a top view of the internal shim 10 as shown in FIG. 1. The top of the shim 18 is shown in detail. The location of guide openings 34 and push rod openings 22 relative to the top of the shim 18 is shown. The arms 26 pass over the push rod openings 22 such that the arms 26 can co-act with the push rods 44, as shown in FIG. 3. Additionally, the space boundaries 62 of the space to be measured are shown relative to the guide openings 34. The adjustable attachment assemblies 30 and the pivot pin assemblies 28 attach the arms 26 to the top of the shim 18.

Having described the preferred embodiments of the invention, it is to be understood that certain variations to the above-described embodiments may be made with the same result without departing from the spirit and scope of the invention. For instance, changes in the number and locations of the gripper openings 14 and the gripper elements 54; the precise variation of the cross sectional area of the push rod 44; and, the location of the guide openings 34, the guide channels 36 are obvious to one skilled in the art. The foregoing description and drawings are not intended to limit the invention so that the scope of the invention may only be ascertained by reading the following claims.

We claim:

1. An internal shim having a dimension less than a dimension of a space defined by boundaries to be accurately measured, said internal shim comprising:

a chassis having a first side and a second side defining a plurality of push rod passages and a plurality of pairs of gripper openings wherein said plurality of pairs of gripper openings are separated by said plurality of push rod passages;

a shim top end wider than said dimension to be measured having a top and bottom and defining a plurality of push rod openings therethrough, said bottom of the shim top end being attached to one end of said chassis such that said plurality of push rod openings of said shim top end and said plurality of push rod passages of said chassis are aligned;

A plurality of guide openings within said shim top end, wherein said plurality of guide openings are in alignment with a plurality of guide channels, wherein said plurality of guide openings and said plurality of guide channels are disposed on said first and second sides of chassis;

a plurality of push rods having top ends and bottom ends disposed within said plurality of push rod passages and passing through said plurality of push rod openings, said plurality of push rods having lengths substantially equal to the lengths of said plurality of push rod passages and having cross sectional dimensions that are uniform along most of their lengths and having a plurality of sections corresponding to the plurality of pairs of gripper openings wherein said cross sectional dimensions of said sections taper from larger dimensions to smaller uniform cross sectional dimensions of said plurality of push rods;

a plurality of pairs of gripper elements, having grippers and rods attached thereto, wherein said plurality of pairs of gripper elements have top ends rotatably attached to said chassis and said plurality of pairs of gripper openings and said plurality of pairs of gripper elements are aligned to be adjacent to said plurality of sections wherein said plurality of sections have cross sectional dimensions that taper from larger dimensions to smaller uniform dimensions;

a plurality of arms, having first ends and second ends, wherein said first ends are rotatably attached to said top of the shim top end, said plurality of arms passing over said plurality of push rod openings and co-acting with said top end of the push rods and said second ends of the arms being adjustably attached to said top of the shim top end; and a plurality of spring mechanisms disposed between said sections of said push rods having a tapered cross section and said chassis.

2. The internal shim of claim 1 when:

said chassis defines a plurality of guide channels through which standard small measurement probes can pass; and said shim top end defines a plurality of guide openings through which standard small measurement probes can pass, and whereby said plurality of guide channels and plurality of guide openings are aligned such that any measurement of said dimension of a space defined by boundaries in which said internal shim is disposed using standard small measurement probes is repeated along the channel that is fixed relative to the internal shim.

3. A method of measuring a space defined by boundaries using the internal shim of claim 1 and a standard small measurement probe, comprising the steps of:

measuring and recording the relevant dimension of the shim;

disposing the internal shim in the space to be measured;

adjusting said plurality of arms such that said internal shim is fixed in said space to be measured;

measuring and recording a plurality of distances from said plurality of guide channels on said first side of said chassis to said boundaries of said space using standard small measurement probes;

repeating said measuring and recording using said plurality of guide channels on said second side of the chassis;

adjusting said plurality of arms such that said internal shim is no longer fixed in said space;

removing said internal shim from said space; and summing the recorded measurements.

* * * * *